United States Patent Office 3,849,364
Patented Nov. 19, 1974

3,849,364
FINELY DIVIDED CRYSTALLINE POLYMERS OF 1,4-DIHALO-2,3-EPOXYBUTANE
Edwin James Vandenberg, Wilmington, Del., assignor to Hercules Incorporated, Wilmington, Del.
No Drawing. Filed Jan. 10, 1973, Ser. No. 322,585
Int. Cl. C08c 11/24; C08f 45/30; C08g 51/30
U.S. Cl. 260—33.8 EP 4 Claims

ABSTRACT OF THE DISCLOSURE

Finely divided crystalline polymers of 1,4-dihalo-2,3-epoxybutane having a particle size less than 100 microns are described. The finely divided polymers are formed directly as a dispersion in certain diluents. The dispersions are prepared by agitating a mixture of epoxybutane and a diluent (or diluent mixture) comprising a partially halogenated aliphatic hydrocarbon with a modified organoaluminum catalyst under polymerizing conditions at a temperature below about $-30°$ C. and continuing to agitate the mixture at below about $-30°$ C. until a dispersion of the finely divided polymer is obtained.

---

This invention relates to finely divided, crystalline polymers of 1,4-dihalo-2,3-epoxybutanes, to dispersions of the polymers in organic diluents and to a process for preparing the dispersions.

It is known that both cis- and trans-1,4-dihalo-2,3-epoxybutanes can be homopolymerized to yield crystalline polymers having outstanding properties. It is also known that the cis- or trans-1,4-dihalo-2,3-epoxybutanes can be copolymerized with small amounts of other monomers containing oxirane or oxetane groups to produce valuable crystalline copolymers. In the past the crystalline polymers of 1,4-dihalo-2,3-epoxybutane have been prepared by polymerizing the epoxybutane in solution or suspension in an inert organic diluent at from $0°$ C. to about room temperature or slightly higher using an aluminum alkyl catalyst. The crystalline polymers so produced are in the form of a solid gel or mass having a continuous network structure. This mass cannot be broken up into smaller particles except through the application of extremely high shear and even then gives particles which are nonuniform in size and tend to be very large. For powder coatings and other coating applications which require finely divided powder, it is therefore necessary to either grind the polymer to an appropriate size or to resort to melt or solution application techniques.

One method which has been proposed to avoid these disadvantages involves forming a dispersion of finely divided polyether in a nonpolar liquid organic diluent by polymerizing the epoxide in the diluent in the presence of a polyether microgen which is swollen by the diluent. The dispersions so obtained are stable and contain very finely divided polymer particles, i.e., particles in sizes ranging from about 0.05 to about 20 microns. However, because the dispersions, as well as any isolated polyether, contain the microgel, subsequent use of the dispersion or polyether is limited to applications wherein the presence of microgel does not cause interference.

Now, in accordance with this invention, it has been discovered that finely divided crystalline polymers of 1,4-dihalo-2,3-epoxybutanes can be formed directly in certain diluents in the absence of any polyether microgel. Accordingly, the present invention relates to a polyether composition consisting of a solid crystalline polymer of a 1,4-dihalo-2,3-epoxybutane in the form of particles having a size less than about 100 microns; to a dispersion of the polymer particles in an inert liquid diluent which is a nonsolvent for the polymer, is at least a partial solvent for the 1,4-dihalo-2,3-epoxybutane monomer and comprises a partially halogenated, aliphatic or cycloaliphatic hydrocarbon; and to a process for preparing the dispersion by agitating a mixture of at least one 1,4-dihalo-2,3-epoxybutane and said diluent with at least a catalytic amount of an organoaluminum catalyst which has been modified by reaction with at least one agent selected from the group consisting of water, boron trifluoride and phosphorus pentafluoride under polymerizing conditions at a temperature below about $-30°$ C. until a polymeric mixture is formed and then continuing to agitate the resulting mixture while maintaining the temperature at blow $-30°$ C. until a dispersion of particles of crystalline polymer having a particle size less than about 100 microns is obtained in said diluent.

Any 1,4-dihalo-2,3-epoxybutane wherein both halogens are the same can be homopolymerized or copolymerized with a small amount and usually from about 0.5 to about 15 weight percent of at least one different monomer which is copolymerizable with said epoxybutane by a cationic mechanism to produce the finely divided crystalline polymers of this invention. Thus, both the cis- and trans-difluoro-, dichloro-, dibromo- or diiodo-2,3-epoxybutanes can be polymerized to yield crystalline polymers.

Comonomers which can be polymerized with the 1,4-dihalo-2,3-epoxybutanes in small amounts to give crystalline copolymers are in general any monomer which is copolymerizable with the epoxybutane and is polymerizable by a cationic mechanism. Such comonomers include cyclic oxides containing from 3 to 5 members in the ring; cyclic esters containing from 4 to 7 members in the ring; compounds of the formulae

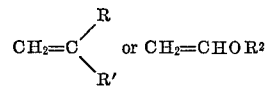

where R is an alkyl, aryl or alkaryl group, R' is hydrogen or R with the proviso that when R' is hydrogen, R is aryl or alkaryl, and that when R and R' are each alkyl they can together form a cyclic structure, and $R^2$ is alkyl; and the 2-oxazolines.

The cyclic oxides which are copolymerizable by a cationic mechanism with the 1,4-dihalo-2,3-epoxybutanes are epoxides (i.e., oxiranes), oxetanes and furans.

Exemplary of epoxide comonomers are the alkylene oxides such as ethylene oxide,
propylene oxide,
1-butene oxide,
cis-2-butene oxide,
trans-2-butene oxide,
isobutylene oxide,
1-hexene oxide, and the like, the cycloaliphatic oxides such as cyclohexene oxide,
vinyl cyclohexene oxide,
α-pinene epoxide,
cyclooctene oxide,
dipentene epoxide, and the like, arylalkylene oxides such as styrene oxide, and the like,
alkylenylalkylene oxides such as butadiene monoxide, and the like, epoxy ethers such as alkyl glycidyl ethers, as for example,
methyl glycidyl ether,
ethyl glycidyl ether,
isopropyl glycidyl ether,
t-butyl glycidyl ether, n-hexyl glycidyl ether,
n-octyl glycidyl ether, and the like,
aryl glycidyl ethers, such as
   phenyl glycidyl ether,
   naphthyl glycidyl ether, and the like,
unsaturated glycidyl ethers such as the alkenyl glycidyl ethers as for example,
   vinyl glycidyl ether,
   allyl glycidyl ether, and the like,
the alkenyl aryl glycidyl ethers such as
   o-allylphenyl glycidyl ether,
   p-crotylphenyl glycidyl ether, and the like
the acetylenically unsaturated epoxides such as the epoxy alkynes containing 5 to 18 carbon atoms and particularly
   1,2-epoxy-4-decyne,
   1,2-epoxy-4-hexyne,
   cis- and trans-5,6-epoxy-8-decyne,
   cis- and trans-5,6-epoxy-2,8-decadiyne, and the like,
the heterocyclic epoxides such as
   5,6-epoxy-1,3-dioxepane
   2-methyl-5,6-epoxy-1,3-dioxepane,
   2-butyl-5,6-epoxy-1,3-dioxepane,
   2,2-dimethyl-5,6-epoxy-1,3-dioxepane,
   3,4-epoxy-tetrahydropyran, and the like,
glycidyl esters such as
   glycidyl acetate,
   glycidyl propionate,
   glycidyl pivalate,
   glycidyl methacrylate,
   glycidyl acrylate, and the like,
alkyl glycidates such as
   methyl glycidate,
   ethyl glycidate, and the like,
haloalkylene oxides such as
   epifluorohydrin,
   epichlorohydrin,
   epibromohydrin,
   epiiodohydrin,
   2-methyl-3-chloro-1,3-epoxypropane,
   1,2-dichloro-3,4-epoxybutane,
   1-chloro-3,4-epoxybutane,
   1-chloro-4,5-epoxypentane,
   1,1-dichloro-2,3-epoxypropane,
   1,1,1-trichloro-2,3-epoxypropane,
   1,1,1-trichloro-3,4-epoxybutane,
   1,1,1-trifluoro-2,3-epoxypropane, and the like,
as well as a different cis- or trans-1,4-dihalo-2,3-epoxybutane, haloalkyl glycidyl ethers such as
   2,2-bis(chloromethyl)ethyl glycidyl ether,
   2-chloroethyl glycidyl ether,
   2-bromoethyl glycidyl ether,
   2-chloro-1-methylethyl glycidyl ether,
   2,2,2-tris(chloromethyl)ethyl glycidyl ether, and the like,
haloaryl glycidyl ethers such as
   p-chlorophenyl glycidyl ether,
   o-chlorophenyl glycidyl ether, and the like,
haloalkylaryl glycidyl ethers such as:
   chloromethylphenyl glycidyl ether,
   chloromethylnaphthyl glycidyl ether, and the like.

Exemplary of the oxetanes are oxetane (also known as trimethylene oxide),
   2-methyl oxetane,
   2-ethyl oxetane,
   2-butyl oxetane,
   2-octyl oxetane,
   2-cyclohexyl oxetane,
   2-methoxy oxetane,
   2-ethoxy oxetane,
   2-propoxy oxetane,
   2-hexoxy oxetane,
   2-methoxymethyl oxetane,
   2-butoxymethyl oxetane,
   2-benzyl oxetane,
   2-phenoxy oxetane,
   2-benzyloxymethyl oxetane,
   2-allyl oxetane,
   2-vinylbenzene oxetane,
   2,2-dimethyl oxetane,
   2-methoxy-2-methyl oxetane,
   2-methallyl-2-methyl oxetane,
   2-methyl-3-methyl oxetane,
   2-methyl oxetane,
   3-methyl oxetane,
   3-octyl oxetane,
   3-cyclohexyl oxetane,
   3-phenyl oxetane,
   3-allyl oxetane,
   3-methoxy oxetane,
   3-hexoxy oxetane,
   3-methoxymethyl oxetane,
   3-decoxymethyl oxetane,
   3,3-dimethyl oxetane,
   3,3-diisopropyl oxetane,
   3,3-dioctyl oxetane,
   3-methoxy-3-methyl oxetane,
   3-ethoxymethyl-3-methyl oxetane,
   3,3-bis(phenoxymethyl) oxetane,
   3-vinyl-3-methyl oxetane,
   3,3-bis(allyl) oxetane,
   2-methyl-3-methyl-4-methyl oxetane,
   2-methyl-4-methyl oxetane, and the like, haloalkyl and haloalkoxy oxetanes such as 2-chloromethyl oxetane,
   3-β-bromoethyl oxetane,
   2-fluoromethyl oxetane,
   2-trifluoromethyl oxetane,
   2-γ-iodopropyl oxetane,
   2-β-chlorobutyl oxetane,
   2-fluoromethoxy oxetane,
   2-chloromethoxy oxetane,
   2-bromomethoxy oxetane,
   2-iodomethoxy oxetane,
   2-β-chloroethoxy oxetane,
   2-β-bromobutoxy oxetane,
   2-β-fluorooctoxy oxetane,
   2-fluoromethoxy methyl oxetane,
   2-β-chloroethoxy methoxy oxetane,
   2-γ-bromoisopropoxy methyl oxetane,
   2-γ-iodobutoxy methyl oxetane,
   2-γ-fluorohexoxy methyl oxetane,
   2-ω-chlorodecoxy methyl oxetane,
   3-chloromethyl oxetane,
   2-β-bromoethyl oxetane,
   3-β-iodomethyl oxetane,
   3-trifluoromethyl oxetane,
   3-β-iodopropyl oxetane,
   3-β-chlorobutyl oxetane,
   3,3-bis(chloromethyl) oxetane,
   3,3-bis(fluoromethyl) oxetane,
   3,3-bis(iodomethyl) oxetane,
   3,3-bis(bromomethyl) oxetane,
   3-fluoromethoxy oxetane,
   3-chloromethoxy oxetane,
   3-bromomethoxy oxetane,
   3-iodomethoxy oxetane,
   3-β-chloroethoxy oxetane,
   3-ω-bromobutoxy oxetane,
   3-β-fluorooctoxy oxetane,
   3-fluoromethoxy methyl oxetane,
   3-β-chloroethoxy methyl oxetane,
   3-β-bromoisopropoxy methyl oxetane,
   3-ω-iodobutoxy oxetane,
   3-ω-fluorohexoxy methyl oxetane,
   3-ω-chlorodecoxy methyl oxetane, and the like.

Exemplary of the furans are the tetrahydrofurans such as tetrahydrofuran,
2-methyltetrahydrofuran,
2,3,4-trimethyltetrahydrofuran, and the like, halo-tetrahydrofurans such as 3-(β-chloroethyl)-tetrahydrofuran,
2-trifluoromethyltetrahydrofuran,
2,3,4-tris(trifluoromethyl)-tetrahydrofuran, and the like.

The cyclic esters which are copolymerizable by a cationic mechanism with a 1,4-dihalo-2,3-epoxybutane in accordance with this invention are lactones having 4 to 7 members in the ring, such as, for example, β-propiolactone, β-butyrolactone, γ-butyrolactone, pivalolactone, γ-valerolactone, γ-caprolactone, ε-caprolactone and the like.

Preferred compounds of the formula

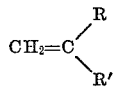

which are copolymerizable by a cationic mechanism with the 1,4-dihalo-2,3-epoxybutane in accordance with this invention include compounds wherein R and/or R' are alkyl groups containing 1 to 10 carbon atoms, aryl groups containing 6 to 12 carbon atoms and alkaryl groups containing 7 to 30 carbon atoms. Typical compounds of this type include isobutylene, styrene, α-methylstyrene, p-methyl styrene, p-methyl-α-methyl styrene and β-pinene. Preferred compounds of the formula $CH_2=CHOR^2$ are the vinyl alkyl ethers where $R^2$ is an alkyl group containing 1 to 10 carbon atoms and preferably a lower alkyl containing 1 to 6 carbon atoms.

The 2-oxazolines which are copolymerizable by a cationic mechanism with a 1,4-dihalo-2,3-epoxybutane in accordance with this invention are compounds of the formula

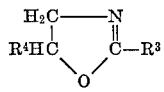

where $R^3$ is hydrogen, alkyl, aryl, alkaryl or cycloalkyl and $R^4$ is hydrogen or alkyl. Preferably the 2-oxazolines are compounds wherein $R^3$ is an alkyl group containing 1 to 10 carbons, phenyl, biphenyl, an alkaryl group containing 7 to 20 carbon atoms, or a cycloalkyl group containing 6 to 12 carbon atoms and $R^4$ is hydrogen or an alkyl group containing 1 to 10 carbon atoms. Typically the 2-oxazolines are 2-methyl-2-oxazoline, 2-ethyl-2-oxazoline, 2-isobutyl-2-oxazoline, 2-dodecyl-2-oxazoline, 2-octadecyl-2-oxazoline, 2-phenyl-2-oxazoline, 2-cyclohexyl-2-oxazoline 2-p-methylphenyl-2-oxazoline, 2-ethyl-5-methyl-2-oxazoline, 2,5-dimethyl-2-oxazoline, 2-methyl-5-octyl-2-oxazoline, 2-phenyl-5-methyl-2-oxazoline, and the like.

The finely-divided crystalline polymers of the invention preferably contain from 100% to about 85% of a 1,4-dihalo-2,3-epoxybutane and from 0 to about 15% of at least one different monomer. Usually, when the polymer is a copolymer, the comonomer content will range from about 0.5 to about 15% and preferably from about 1 to about 10%. The homopolymers and copolymers are characterized by being generally hard, tough, high melting, partially crystalline solids. The homopolymers from the trans monomers are believed to be meso-diisotactic polymers having dl—dl carbon sequences, and the homopolymers from the cis monomers are believed to be racemic diisotactic polymers with dd—dd and ll—ll carbon sequences. The copolymers are of the random or block type and are further characterized by having an X-ray pattern similar or related to that of the 1,4-dihalo-2,3-epoxybutane. The copolymers of the cis-1,4-dihalo-2,3-epoxybutanes usually have melting points of at least about 150° C. and preferably at least about 180° C. The copolymers of the trans-1,4-dihalo-2,3-epoxybutanes usually have melting points of at least about 80° C. and preferably at least about 100° C.

The crystalline polymers of the invention (dispersed in an inert diluent or in the form of dry solids, as the case may be) are, as stated, in the form of finely divided particles, i.e., particles having a size less than about 100 microns and preferably less than about 60 microns. Usually the particles will fall within the ranges of about 0.05 to about 100 microns, preferably about 0.1 to about 60 microns and most preferably about 0.5 to about 20 microns.

The finely-divided polymers of this invention find use in plastics and coatings, as well as wax applications and are particularly useful as powder, static spray and fluid bed coatings. The polymers of this invention can be used as such or as dispersions after the addition of stabilizers, fillers or any other desired additives such as cross-linking agents, gas-releasing agents, etc. The dispersions can also be transferred with appropriate emulsifiers to an aqueous medium to give, after removal of the organic diluent, aqueous emulsions or dispersions.

The polymers of this invention are still further characterized by being generally insoluble in water, aliphatic hydrocarbons, aromatic hydrocarbons and chlorinated solvents but generally soluble in cyclohexanone and dimethyl formamide at or above about 50° C. The preferred polymers are high molecular weight substantially linear polyethers which preferably have a Reduced Specific Viscosity (RSV) of at least about 0.4 and more preferably of at least about 0.5 when measured as a 0.1% or 0.2% solution in dimethyl formamide at 50° C. The polymers are partially crystalline in an unoriented state, exhibiting a crystallinity of at least about 5% and preferably at least 10% as determined by differential scanning calorimetry.

The finely-divided crystalline polymers of 1,4-dihalo-2,3-epoxybutane of this invention are produced as a dispersion in an inert liquid diluent which is a nonsolvent for the polymer, is at least a partial solvent for the epoxybutane and comprises a partially halogenated, aliphatic or cycloaliphatic hydrocarbon. Preferably, the diluent will have a freezing point lower than −50° C. and most preferably lower than −70° C. The dispersions are prepared by agitating a mixture of the 1,4-dihalo-2,3-epoxybutane (and any other monomer or monomers) and the diluent with at least a catalytic amount of an organoaluminum catalyst which has been modified by reaction with water, boron trifluoride, phosphorus pentafluoride or mixtures thereof under polymerization conditions at a temperature below about −30° C. and preferably below about −50° C. until a polymeric mixture is formed and then continuing to agitate the resulting mixture while maintaining the temperature at below about −30° C. and preferably below about −50° C. until a dispersion of particles of crystalline polymer having a particle size less than about 100 microns is obtained in the diluent.

The polymerization catalyst can be any organoaluminum catalyst which has been modified by reaction with water, boron trifluoride and/or phosphorus pentafluoride. Water modified catalysts are described in U.S. Pats. 3,065,188 and 3,135,705. The boron trifluoride and phosphorus pentafluoride modified catalysts can be produced by reacting an organoaluminum compound or the organoaluminum-water catalyst with from about 0.05 to about 3 moles, and preferably from about 0.1 to about 1 mole, of boron trifluoride, phosphorus pentafluoride or mixtures thereof, per mole of aluminum at below about −30° C. Actual conditions will, of course, depend on the organoaluminum compound, diluent, and epoxybutane monomer or mixture of monomers being polymerized. Any desired procedure can be used for modifying the organoaluminum compound or catalyst. Generally, better results are obtained if the organoaluminum compound or catalyst and modifier(s) are prereacted and the reaction product added to the polymerization mixture. This can be done in the presence or absence of an inert diluent or mixtures of diluents. Excellent results can also be obtained by reacting the organoaluminum compound or catalyst with the modifier(s) in situ. This can be accomplished by adding the specified amount of modifier(s) to the epoxybutane-diluent mixture being polymerized and then adding the organoaluminum compound or catalyst, or the two can be added to the polymerization reaction mixture simultaneously. When water is used, the amount will usually be within the range of 0.5 to 1 mole of water per mole of aluminum but a ratio of from 0.1:1 to about 2:1 can be used. The preferred organoaluminum compounds are aluminum alkyl compounds, as, for example, a trialkylaluminum, a dialkylaluminum halide, a dialkylaluminum hydride, an alkylaluminum dihydride, etc. The alkyl group of the alkylaluminum compound can be any alkyl, as, for example, methyl, ethyl, isopropyl, butyl, isobutyl, hexyl, octyl, etc. The amount of the catalyst used will depend on the monomer(s) being polymerized the polymerization conditions being used etc. but will generally vary from a small catalytic amount up to a large excess, and usually will be within the range of from about 0.2 to 10 mole percent based on the monomer. The catalyst can be added all at once, portionwise, or continuously throughout the polymerization.

The polymerization reaction, as stated, is carried out in an inert liquid diluent which is a nonsolvent for the polymer, is at least a partial solvent for the epoxybutane and comprises a partially halogenated, aliphatic or cycloaliphatic hydrocarbon. Exemplary of the partially halogenated hydrocarbon diluents which can be used are methylene chloride, methylene bromide, ethyl chloride, butyl chloride, 1,1-dichloroethane, 1,1-dibromoethane, 1,1-dichloropropane, 1,1-dichlorobutane, trifluoromethane, dichlorofluoromethane, chlorodifluoromethane, 1,1-difluoroethane, 1,1-difluoro - 1 - chloroethane, trichloroethylene, chlorocyclohexane, bromocyclohexane, etc., or combinations of such partially halogenated hydrocarbons with each other or with minor amounts (i.e., less than 50%) of non-halogenated hydrocarbon diluents such as methane, ethane, propane, butane, hexane, n-heptane, cyclopentane, cyclohexane, methyl cyclohexane, ethylene, propylene, butene-1, cyclopentene, cyclohexene, etc., with fully halogenated, aliphatic or cycloaliphatic hydrocarbons such as carbon tetrachloride, carbon tetrafluoride, chlorotrifluoromethane, dichlorodifluoromethane, fluorotrichloromethane, perchloroethylene, perfluoroethylene, perfluoropropylene, perchloroethylene, 1,1,1-trichloro - 2,2,2 - trifluoroethane, 1,1,2,2-tetrachloro - 1,2 - difluoroethane, 1,1,2,2-tetrafluoro-1,2-dichloroethane, etc., or with halogenated aromatic hydrocarbons such as chlorobenzene, difluorobenzene, dichlorobenzene, etc. The amount of diluent employed is, of course, largely a matter of choice but should be sufficient to provide ease of agitation and usually will provide a final polymer solids content of from about 5 to about 30%. The polymerization is carried out under conditions of agitation to insure adequate contact of the monomer(s) and catalyst and agitation is continued until a dispersion of particles having a size less than about 100 microns is formed in the diluent. Agitation can be effected in any suitable way, as, for example, by using propeller, anchor, blade, cylinder-shaped or otherwise shaped stirrers. The stirrers are generally used in such a way that shearing forces are produced in the reaction vessel. The rate or degree of agitation necessary for producing the dispersions of the invention will, of course, vary depending on such factors as temperature, type of catalyst, concentration of polymer in the diluent, dimensions of the reaction vessel, etc. Usually, the rate of agitation will be such as to provide a mixing time of less than 5 minutes and preferably less than 2 minutes during the major part of the total time of agitation. By "mixing time" is meant the minimum elapsed time required to homogenize an added trace of material, i.e., to achieve a degree of mixing where- at no measureable difference in tracer concentration is observable in random samples selected from any point of the reaction vessel.

The polymer can be recovered from the dispersions by any of the usual means. In the case of the larger particle dispersions, the polymer can be recovered by filtration, centrifugation, or any other desired means. In the case of the very fine particle dispersions, it is usually preferable to coagulate them by addition of alcohol, steam, etc., and then recover the polymer as in the slurry systems. The dispersions can, of course, also be concentrated by creaming, centrifugation, stripping and any of the other means known in the art.

The dispersions produced in accordance with this invention are stable products and do not require the use of dispersion aids such as surface-active materials and/or block or graft polymers. Such aids, however, can be added if desired. For example, any surface-active agent and/or block or graft polymer composed of both polar and nonpolar groups which are soluble or dispersible in the diluent can be used. They can be added before, during or after polymerization. Surface-active materials that can be so used are the ethylene oxide adducts of fatty alcohols, rosins and hydrogenated rosins, etc., and block or graft polymers of hydrocarbon-soluble and hydrocarbon-insoluble poly (epoxides).

The finely-divided polymers of this invention are suitable for a wide variety of applications and can be used as such or as dispersions in a diluent, which use applications will, of course, depend on the form as well as the particular polymer involved. For example, dispersions of the crystalline homo- and copolymers of cis-1,4-dichloro - 2,3 - epoxybutane in an organic diluent, when formulated to include suitable stabilizers, fillers, plasticizers, pigments, cross-linking agents, gas-releasing agents, etc., can be used as protective coatings on metal and other substrates, to prepare flame-resistant foams, films or fibers to impregnate paper, textile fabrics, etc., as binders for nonwovens, as adhesives, etc. In the case of dispersions of the polymer in other diluents such as water, the dispersions are particularly useful in emulsion applications where, for one reason or another, organic solvents are not suitable. The finely-divided polymers in dry form can be dry blended with other materials, redispersed in one or more diluents or, if desired, wet blended with other materials. This is of particular significance in the preparation of polymer blends. Thus, by simple dry or wet blending techniques, it is possible to obtain a well-dispersed mixture or blend having unique or special properties such as flame resistance, impact resistance, etc. The dry polymers are particularly useful for coatings applied by powder, static spray or fluid bed techniques. Many other applications of these finely-divided powders or dispersions will be apparent to those skilled in the art.

The following examples illustrate the preparation of the finely-divided polymers of this invention. All parts and percentages are by weight unless otherwise indicated. Particle size is stated as the diameter of a sphere (or its calculated equivalent unless otherwise stated) and was determined by microscopic examination. The molecular weight of the polymers is shown by their Reduced Specific Viscosity (RSV). By the term "Reduced Specific Viscosity" is meant the $\eta_{sp.}/c.$ determined on a 0.1% or 0.2% solution of the polymer in dimethyl formamide at 50° C., essentially equivalent results being obtained at either dilution. The melting point of the polymer is determined by differential thermal analysis (DTA) or by differential scanning calorimetry (DSC) and is the temperature at which the last crystallinity disappears. The percent crystallinity was also determined by differential scanning calorimetry (DSC), using a Perkin-Elmer Differential Scanning Calorimeter (Model 1 B). With this instrument the heat of fusion per unit weight on melting the polymer sample, $\Delta H_f$, cal./g., is measured. Then, knowing the heat of fusion for 100% crystalline polymer, $\Delta H_f°$, cal./g., the percent crystallinity of the sample is $$\frac{\Delta H_f}{\Delta H_f°} \times 100.$$

The crystalinity of the polymers of this invention is due solely to the 1,4-dihalo-2,3-epoxybutane units present in the polymer. The $\Delta H_f°$'s were determined for crystalline homopolymer by Flory's indirect method [P. J. Flory, J. Chem. Phsics, 10, 51 (1942)] from measurements of melting point, $T_m$, as a function of diluent volume fraction, $\phi$, for a given polymer-diluent pair, using the relationship derived by Flory:

$$\frac{1/T_m - 1/T_m°}{\phi} = \frac{R}{\Delta H_u} \frac{V_u}{V_1}\left(1 - \frac{BV_1 \phi}{RT_m}\right)$$

where $T_m°$ and $T_m$ are the melting temperatures of the pure polymer and the polymer-diluent mixtures; $\Delta H_u$ is the enthalpy of fusion per repeating unit of 100% crystalline polymer; R is the gas constant; $V_u/V_1$ is the ratio of molar volumes of the polymer repeating unit and the diluent; and B is a diluent-polymer interaction constant. By plotting $(1/T_m - 1/T_m°)/\phi$ versus $\phi/T_m$, a straight line is obtained with an intercept at $$\frac{\phi}{T_m} = 0$$

of $RV_u/H_uV_1$. The value of $\Delta H_u$ is obtained immediately since $V_u$ and $V_1$ are known from density and molecular weight data. The $\Delta H_f°$, cal./g., can be calculated from $\Delta H_u$ and the molecular weight of the polymer repeating unit. The $\Delta H_f°$ for crystalline poly(cis-1,4-dichloro-2,3-epoxybutane) was determined to be 30.4 cal./g.

Crystallization half-time is also determined by differential scanning colorimetry. In this determination, the polymer is heated to 260° C., the temperature maintained thereat for 3 minutes, and then reduced rapidly to 160° C. in 1 minute, and the time to crystallization peak measured.

EXAMPLE 1

A 12-liter flask with four creases in the sides and a half-moon Teflon agitator (6″, longest dimension) was placed in a cooling bath and air was removed from the flask and replaced with nitrogen. The flask was charged with 12,000 parts of dry methylene chloride and 1100.0 parts of a 99.8:0 mixture of cis-1,4-dichloro-2,3-epoxybutane and trans-1,4-dichloro-2,3-epoxybutane and agitation was started and the speed adjusted to give vigorous mixing and a mixing time less than 2 minutes (greater th an 200 r.p.m.). The temperature of the charge was reduced using Dry Ice in the surrounding bath and when the temperature was below −20° C., 1640 parts of dry ethyl chloride were added. The temperature of the flask contents was further reduced by lowering the bath temperature and, when the temperature of the flask contents reached −78° C., 21.3 parts of a triisobutylaluminum-water catalyst were added. After 0.3 hour and 1.5 hours, respectively, additional portions of 10.6 parts of catalyst were added, the reaction temperature being maintained at −78° C. ±0.5° C. The catalyst used in this example was a 4.4M solution of triisobutylaluminum which had been reacted with 0.67 mole of water per mole of aluminum. The catalyst was prepared by diluting commercial triisobutylaluminum with n-heptane to a 0.5M concentration, adding 0.67 mole of water per mole of aluminum dropwise with agitation over a period of 3.5 hours at 0° C., permitting the temperature to rise over 4 hours to 25° C., letting the mixture stand at 25° C. for at least 24 hours and then vacuum distilling off sufficient heptane at 50° C. to give a catalyst concentration of 4.4M with respect to aluminum.

After five hours of polymerization time, the mixture in the polymerization vessel became very viscous and stirring was difficult, the temperature gradually rising to −74° C. over the last 2.5 hours. The polymerization reaction was terminated by adding 215 parts of 2N aqueous hydrogen chloride in ethanol dropwise with stirring, following which the liquid was drained from the surrounding bath and the temperature of the mixture was permitted to rise slowly for 1 hour while the mixture was stirred. The mixture was then permitted to stand without agitation at room temperature overnight. The next day the polymer mixture was washed three times by stirring with three liters of 10% aqueous hydrogen chloride for 6 hours and removing the water layer, and then finally washed with water until neutral. The methylene chloride dispersion so obtained contained particles having a particle size range of 1 to 7 microns and an average size of 2 microns. The polymer particles were isolated by adding an equal volume of methanol, collecting the particles by filtration, washing with methanol until essentially all of the methylene chloride and unreacted monomer were removed, stabilizing by slurrying in methanol with 0.5% of Irganox 1010 (pentaerythritol tetraester of 3(3,5-di-tert-butyl-4-hydroxyphenyl) propionic acid) and 2.0% of ERL 2774 (diglycidyl ether of bisphenol A) based on dry weight of the polymer, and then finally drying. The isolated product (recovered in 88% conversion) was a crystalline polymer of cis-1,4-dichloro-2,3-epoxybutane having an RSV of 0.66, a melting point of 232° C., and a sulfate ash of 0.006%. By DSC it was found to have a heat of fusion of 9.6 calories/gram. The product was a soft powder having a particle size less than 60 microns with most particles of a size less than 20 microns. The application of a light rubbing pressuer between the fingers broke the particles into an even more finely divided powder having most of the particles in the 1 to 7 micron range.

The finely-divided polymer of this example was evaluated as a coating material on steel panels using the following techniques. A portion of the methylene chloride dispersion obtained above (prior to isolation of the polymer particles) was sprayed onto a Bonderite 100 treated steel test panel using an air spray gun. The test panel was next air dried, baked at 257° C. for 10 minutes and then quenched, following which the panel was resprayed with the dispersion, and then dried, baked and quenched, as above. A clear, hard, glossy coating of 1.2 mil thickness was formed, the coating adhering well to the panel. A portion of the dried powdery product obtained above, following a very light treatment in a Waring Blendor to break up any loose agglomerates, was applied to a grounded Bonderite 1000 treated steel panel using an electrostatic powder gun, and the test panel was baked at 257° C. for 7 minutes and then quenched. A clear, hard, glossy coating of 0.7 mil thickness was formed, the coating adhering well to the panel.

EXAMPLE 2

The procedure of Example 1 was repeated except that 13,000 parts of methylene chloride and 1050 parts of ethyl chloride were used, the temperature was maintained at −78° C.±1° C., additional catalyst was added at 1.0 and 1.75 hours instead of 0.3 and 1.5 hours, and following termination of the reaction, the mixture was stirred for 2 hours during which time the temperature rose to −51° C. and then was permitted to stand overnight at room temperature. The methylene chloride dispersion contained polymer particles having a particle size range of 1 to 6 microns nd an average size of 2 microns (measured on a sample prepared by diluting 1 ml. of the dispersion with 10 ml. of tetrachloroethane). The isolated product (obtained in 93% conversion) was a crystalline polymer of cis-1,4-dichloro-2,3-epoxybutane having an RSV of 0.72, and a melting point of 235° C. By DSC, the polymer was found to have a heat of fusion of 9.9 calories/gram. The product was a soft powder having a particle size less than 100 microns.

EXAMPLE 3

The procedure of Example 1 was repeated with the following exceptions. The monomer charge was 1100 parts of a 99.5:0.5 mixture of cis-1,4-dichloro-2,3-epoxybutane and trans-1,4-dichloro-2,3-epoxybutane; 14,200 parts of methylene chloride and 199 parts of ethyl chloride were used; 21.3 parts of catalyst were added originally, followed by 10.6 parts after 0.75 hour of reaction time; the reaction temperature was maintained at −78° C. ±1° C. for 1 hour and at −75.5° C.±1° C. for 4 hours; and, following termination of the reaction, the mixture was stirred for 1.5 hours, during which time the temperature rose to −63° C., and then was permitted to stand overnight at room temperature. Throughout the major part of the run, the mixing time was maintained at less than 5 minutes. The product was a methylene chloride dispersion (6.6% solids) of polymer particles having an average particle size of 2 microns (measured on a sample prepared by diluting 1 ml. of the dispersion with 10 ml. of tetrachloroethane). The stability of the dispersion was measured by permitting a sample of the dispersion to stand for 8 months at room temperature. There was no evidence in the dispersion that particles had settled or agglomerated. The isolated product was a crystalline polymer (obtained in 88% conversion) containing 99.5% of cis-1,4-dichloro-2,3-epoxybutane and 0.5% of trans-1,4-dichloro-2,3-epoxybutane. The copolymer had a sulfate ash of 0.008%, an RSV of 1.50 and a melting point of 234° C. By DSC the polymer was found to have a heat of fusion of 10.0 calories/gram. The product was a fine powder having a particle size less than about 100 microns.

EXAMPLE 4

The procedure of Example 1 was repeated except that: the monomer charge was 1100 parts of a 99:1 mixture of cis-1,4-dichloro-2,3-epoxybutane and trans-1,4-dichloro-2,3-epoxybutane; 13,000 parts of methylene chloride and 1300 parts of ethyl chloride were used; 21.3 parts of catalyst were added originally, followed by 10.6 parts of additional catalyst at 1.0 and 2.3 hours, respectively; the polymerization temperature was maintained at −78.5° C.±0.5° C. for the first hour, at −75° C.±1° C. for the next 2 hours, and then permitted to rise to −72° C. during the last 2 hours; the reaction was terminated after 5 hours by adding 257 parts of 2N aqueous hydrogen chloride in ethanol; and the mixture was stirred for 1.8 hours, during which time the temperature rose to −62° C. and then was permitted to stand overnight at room temperature. The washed product was a methylene chloride dispersion of polymer particles having a particle size range of 1 to 6 microns and an average size of 4 microns (measured on a sample prepared by diluting 1 ml. of the dispersion with 10 ml. of tetrachloroethane). The isolated product was a crystalline copolymer of 99.0% cis-1,4-dichloro-2,3-epoxybutane and 1.0% of trans-1,4-dichloro-2,3-epoxybutane (obtained in 88% conversion) having a sulfate ash of 0.010%, an RSV of 0.63 and a melting point of 232° C. By DSC the polymer was found to have a heat of fusion of 8.1 calories/gram. The product was a soft, finely-divided polymer which, following the application of a light rubbing pressure between the fingers, had a particle size less than 60 microns.

EXAMPLE 5

The procedure of Example 4 was repeated except that the monomer charge was a 97.5:2.5 mixture of cis-1,4-dichloro-2,3-epoxybutane and trans-1,4-dichloro-2,3-epoxybutane, 13,400 parts of methylene chloride and 1000 parts of ethyl chloride were used, additional catalyst was added at 0.5 and 2.0 hours, the polymerization temperature was maintained at −78.5° C.±1° C. during the entire run, and the reaction was terminated after 5 hours by adding 215 parts of 2N aqueous hydrogen chloride in ethanol, following which the mixture was stirred for 2 hours, the temperature rising to −65° C. The product was a methylene chloride dispersion of particles having a particle size range of 1 to 10 microns and an average size of 6 microns. The isolated product was a crystalline copolymer of 97.5% cis-1,4-dichloro-2,3-epoxybutane and 2.5% of trans-1,4-dichloro-2,3-epoxybutane (obtained in 87% conversion) having an RSV of 0.72, a melting point of 225° C., a heat of fusion of 7.9 calories/gram and a particle size less than 100 microns.

EXAMPLE 6

A one liter creased flask equipped with a Teflon anchor type stirrer (3", longest dimension) was placed in a cooling bath and air was removed from the flask and replaced with nitrogen. The flask was charged with 561 parts of dry methylene chloride and 122.4 parts of n-heptane and agitation was started, the speed of the agitator being adjusted to 300 r.p.m. (mixing time less than 2 minutes). The temperature of the charge was reduced using Dry Ice in the bath and when the temperature reached −79° C., 2.32 parts (12.0 millimoles) of the triisobutyl-aluminum-water catalyst of Example 1 was added with stirring, following which 0.41 part (6 millimoles) of boron trifluoride was added over 3 minutes. The charge was stirred for 9 minutes and then a total of 100.4 parts of trans-1,4-dichloro-2,3-epoxybutane was added dropwise over a period of 2 hours, the rate of addition being 1.0 to 1.3 part/minute for the first hour and 0.4 to 0.5 part/minute for the second hour and the temperature being maintained at −78° C. At this point the agitator speed was increased to 700–800 r.p.m. to ssure a mixing time of less than 5 minutes and provide adequate mixing as the reaction mixture became more viscous, and agitation was continued at this speed for an additional 5.5 hours (total reaction time of 7.5 hours). Additional catalyst (prepared by diluting the catalyst of Example 1 to a 1 molar solution with n-heptane) was added dropwise in the amounts of 4.4 parts after 3.5 hours and 2.2 parts after 5.5 hours of total reaction time, and the temperature of the reaction mixture gradually increased to −72° C.

Agitation was continued at −72° C. for an additional 2 hours, after which time the polymerization reaction was terminated by adding 17 parts of 2N aqueous hydrogen chloride with agitation. The cooling bath was removed and the mixture was agitated continuously until the temperature reached room temperature. Microscopic examination of a sample of the reaction mixture showed that the polymer was predominantly in the form of arrowhead shaped particles 12 x 30μ in size (98%) with some particles in the 1–2μ size. The polymer mixture was next washed three times by stirring with 400 parts of 10% aqueous chloride for 2 hours and removing the water layer, and then finally washed with water until neutral. The polymer particles were isolated by adding volume of methanol, collecting the particles by filtration, washing with methanol until substantially free of methylene chloride and unreacted monomer, washing once with a solution of 0.2% of 4,4'-thiobis-(3-methyl-6-tert.-butyl phenol) in methanol, and then drying. The isolated product (recovered in 79% conversion) was a crystalline poly(trans-1,4-dichloro-2,3-epoxybutane) having an RSV of 0.43 and a particle size less than about 100 microns.

EXAMPLE 7

A 500 ml. flask equipped with an agitator having a half moon Teflon blade (2.5" long) was placed in a cooling bath and air was removed from the flask and replaced with nitrogen. The flask was charged with 327 parts of methylene chloride, 71.3 parts of n-heptane and 70.0 parts of trans-1,4-dichloro-2,3-epoxybutane. Agitation was started and adjusted to a speed of about 300 r.p.m. (mixing time less than 2 minutes) and the temperature of the charge was reduced using Dry Ice in the bath. When the temperature reached −62.5° C. (crystallization of the trans-1,4-dichloro-2,3-epoxybutane occurred at −60° C.), the agitation speed was increased to 500 r.p.m. and 1.63 parts (8.5 millimoles) of the triisobutylaluminum-water catalyst of Example 1 was added with agitation, following which 10 increments of 0.028 part (0.42 millimole) of boron trifluoride were added at 0, 5, 15, 45, 75, 78, 84, 90, 96 and 102 minutes of reaction time, the temperature being maintained at −61° C. to −62° C. At 2.1 hours of reaction time, an additional portion of 0.77 part of triisobutylaluminum-water catalyst was added, the agitation speed was increased to 700 r.p.m. at 2.3 hours and agitation was continued, the reaction temperature being maintained at −55° C. to −60° C. After a total of 5.5 hours of reaction time, the polymerization reaction was terminated by adding 10 parts of 2N aqueous hydrogen chloride in ethanol, following which the cooling bath was removed and the temperature of the mixture was permitted to rise to room temperature with agitation. Microscopic examination of a sample of the reaction mixture showed that the polymer consisted of cylindrical (and some tubular) particles having a diameter of 2 to 5μ and lengths ranging from 5 to 300μ. The mixture was next washed three times by stirring with 240 parts of 10% aqueous hydrogen chloride, washed neutral with water and then isolated according to the procedure of Example 6. The isolated product (recovered in 79% conversion) was 65.7 parts of a crystalline poly(trans-1,4-dichloro-2,3-epoxybutane) having an RSV of 0.38 and a melting point of 140° C. By DSC it was found to have a heat of fusion of 7.4 calories/gram. The dried polymer was a finely divided powder whose particles had a size less than 100 microns.

EXAMPLE 8

The general procedure of Example 6 was repeated except that: the initial charge was 552 parts of dry methylene chloride, 120.2 parts of n-heptane and 9.0 parts of dry ethyl chloride; 84.6 parts of cis-1,4 - dichloro-2,3-epoxybutane was substituted for the 100.4 parts of trans-1,4-dichloro-2,3-epoxybutane; the epoxybutane was added dropwise with stirring at 240 r.p.m. at a rate of 1.3 parts/min. for the first 30 minutes, then at a rate of 0.8 part/min. for the next 15 minutes with the stirring speed increased to 700–800 r.p.m. and finally at a rate of 0.4 part/min. for 84 minutes; the temperature of the reaction was maintained at −73° C. to −77° C.; the total reaction time was 4.25 hours; and no additional catalyst was added. Microscopic examination of a sample of the reaction mixture showed that the polymer was in the form of 5 micron, spiculate, grape nut-like particles. The isolated product (recovered in 92% conversion) was 76.3 parts of crystalline poly(cis-1,4-dichloro-2,3-epoxybutane) having an RSV of 0.73 and a particle size less than about 60 microns. Light rubbing of the powdery particles between the fingers gave a powder with a particle size less than about 20 microns. Exposure of the particles to moderate ultrasonoration in tetrachloroethane for 5 minutes gave a dispersion of particles having a particle size of about 5 microns.

What I claim and desire to protect by Letters Patent is:

1. A process for preparing a dispersion of a crystalline polymer of 1,4-dihalo-2,3-epoxybutane in an inert liquid diluent which is a nonsolvent for the polymer, is at least a partial solvent for the epoxybutane and comprises a partially halogenated, aliphatic or cycloaliphatic hydrocarbon, which process comprises agitating a mixture of at least one 1,4-dihalo-2,3-epoxybutane and said diluent with at least a catalytic amount of an organoaluminum catalyst which has been modified by reaction with at least one agent selected from the group consisting of water, boron trifluoride and phosphorus pentafluoride, under polymerization conditions at a temperature below about −30° C. until a polymeric mixture is formed and then continuing to agitate the resulting mixture while maintaining the temperature at below about −30° C. until a dispersion of particles of crystalline polymer having a particle size less than about 100 microns is obtained in said diluent.

2. The process of claim 1 wherein said epoxybutane is 1,4-dichloro-2,3-epoxybutane.

3. The process of claim 2 wherein said diluent is methylene chloride.

4. The process of claim 1 wherein the particles have a size ranging from about 0.1 micron to about 60 microns.

References Cited
UNITED STATES PATENTS

| 3,135,705 | 6/1964 | Vandenberg | 260—2 EP |
| 3,065,188 | 11/1962 | Vandenberg | 260—823 X |
| 3,634,303 | 1/1972 | Vandenberg | 260—33.8 EP X |

OTHER REFERENCES

Lee et al.: Handook of Epoxy Resins, McGraw-Hill Book Co., 1967, pp. 20–17 and 20–18.

LEWIS T. JACOBS, Primary Examiner

U.S. Cl. X.R.

260—2 A

PO-1050
(5/69)

UNITED STATES PATENT OFFICE
CERTIFICATE OF CORRECTION

Patent No.  U.S.P. 3,849,364     Dated  November 19, 1974

Inventor(s)  Edwin J. Vandenberg (Case 147)

It is certified that error appears in the above-identified patent and that said Letters Patent are hereby corrected as shown below:

"Col. 1, Line 47 of p.p.;
  "powder" -- should read -- "polymer"

Col. 1, Line 54 of p.p.;
  "microgen" -- should read -- "microgel"

Col. 3, Line 40 of p.p.;
  "..1,3-epoxypropane," -- should read -- "..1,2-epoxypropane,"

Col. 6, Line 34 of p.p.;
  "57" -- should read -- "5%"

Col. 12, Line 51 of p.p.;
  "aqueous chloride" --should read-- "aqueous hydrogen chloride"

Col. 12, Line 53 of p.p.;
  "adding vol-" -- should read -- "adding an equal vol-"

Signed and sealed this 21st day of January 1975.

(SEAL)
Attest:

McCOY M. GIBSON JR.                C. MARSHALL DANN
Attesting Officer                  Commissioner of Patents